United States Patent
Auriol

(10) Patent No.: US 11,668,252 B2
(45) Date of Patent: Jun. 6, 2023

(54) METHOD FOR CONTROLLING A CLEARANCE CONTROL VALVE DURING A STEP-CLIMB IN CRUISE PHASE

(71) Applicant: SAFRAN AIRCRAFT ENGINES, Paris (FR)

(72) Inventor: Jacques Auriol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 337 days.

(21) Appl. No.: 16/930,812

(22) Filed: Jul. 16, 2020

(65) Prior Publication Data

US 2021/0017913 A1 Jan. 21, 2021

(30) Foreign Application Priority Data

Jul. 19, 2019 (FR) ..................... 19 08226

(51) Int. Cl.
*F02C 9/22* (2006.01)
*F01D 11/24* (2006.01)

(52) U.S. Cl.
CPC ............... *F02C 9/22* (2013.01); *F01D 11/24* (2013.01); *F05D 2220/323* (2013.01); *F05D 2270/02* (2013.01)

(58) Field of Classification Search
None
See application file for complete search history.

(56) References Cited

U.S. PATENT DOCUMENTS

| 2013/0054055 A1 | 2/2013 | Mathews, Jr. et al. |
| 2014/0058644 A1* | 2/2014 | Adibhatla .............. B64D 31/06 701/100 |
| 2014/0136030 A1 | 5/2014 | Mathews, Jr. et al. |

(Continued)

FOREIGN PATENT DOCUMENTS

| EP | 2 565 425 A2 | 3/2013 |
| EP | 2 565 425 A3 | 3/2013 |

(Continued)

OTHER PUBLICATIONS

French Preliminary Search Report dated Jan. 23, 2020 in French Application 19 08226 filed Jul. 19, 2019 (with English Translation of Categories of Cited Documents and Written Opinion), citing documents AA-AE and AO-AR therein, 8 pages.

*Primary Examiner* — Michael Lebentritt
(74) *Attorney, Agent, or Firm* — Oblon, McClelland, Maier & Neustadt, L.L.P.

(57) ABSTRACT

A method for controlling a clearance control valve of a turbomachine wherein, during a maneuver to increase engine speed in cruise phase, a command to reduce the opening of the clearance control valve is actuated by a Full Authority Digital Engine Control based on a change in the state of a step-climb signal provided by a flight management system in order to increase clearances at the tips of the turbomachine blades and an increase in the opening of the clearance control valve follows its reduction, at the expiry of either of the following two time limits: a first time limit starting at the change in the state of the step-climb signal and determined not to penalize the performance of the engine for too long and a second time limit starting at the end of the maneuver and determined as a function of a thermal time constant of the casing.

12 Claims, 2 Drawing Sheets

(56) References Cited

U.S. PATENT DOCUMENTS

| | | | |
|---|---|---|---|
| 2015/0159499 A1 | 6/2015 | Bacic et al. | |
| 2015/0159500 A1 | 6/2015 | Carlucci et al. | |
| 2016/0311546 A1* | 10/2016 | Adibhatla | B64D 31/06 |
| 2018/0258785 A1* | 9/2018 | Schelfaut | B64D 27/10 |
| 2018/0371997 A1* | 12/2018 | van der Merwe | F02C 7/18 |

FOREIGN PATENT DOCUMENTS

| | | | | |
|---|---|---|---|---|
| EP | 2 881 546 A1 | 6/2015 | | |
| EP | 2 881 547 A1 | 6/2015 | | |
| EP | 3543805 A1 * | 9/2019 | | B64D 31/00 |
| EP | 3597876 A1 * | 1/2020 | | F01D 11/20 |
| GB | 2552048 A | 1/2018 | | |

* cited by examiner

METHOD FOR CONTROLLING A CLEARANCE CONTROL VALVE DURING A STEP-CLIMB IN CRUISE PHASE

TECHNICAL FIELD

The invention relates, in the field of aircraft turbomachines, to the control of clearances at the tips of turbine blades by cooling the casing and more particularly a method and a system for controlling the clearance control valve during a step-climb in cruise phase.

PRIOR ART

Aircraft turbomachines operating on the combustion principle comprise a turbine to recover the energy from the gases and then convert it into mechanical energy on a drive shaft to drive a fan generating the thrust. The efficiency of the turbine, but also its service life are strongly conditioned by the seals existing between its different stages. In order to improve these seals, wipers are generally included at the blade tips come into contact with an abradable material partially covering the casing.

However, the relative position of the blade tip (rotor and stator) relative to the abradable material can change during the use of the machine according to various parameters including the variation of the temperature of the casing which, when cold, contracts, and when hot, expands, causing it to move both axially and radially relative to the blade tip. This is also the case with the variation of the centrifugal force that leads to a radial displacement of the blade tip and the temperature variation of the set of the discs and of the shaft itself that lead to a mainly axial displacement of the turbine relative to the casing. To these displacements are added the consumptions of clearances linked to the loads and to the dynamics (vibratory dynamics, gyroscopic takeoff force, etc.).

To better control these clearances, it is known to monitor the temperature of the casing with a regulated supply of fresh air at the casing by means of a clearance control valve (ACC for Active Clearance Control) of the turbine. The control of the valve position ensures that of the air flow rate which in turn monitors the clearances at the blade tip.

The main problem resulting from this solution, based on the cooling of the casing, is that the thermal response time of the casing being low vis-à-vis the clearances linked to the centrifugal force (variation in a few seconds), the clearances are left open as much as possible at all operating points as well as in transient mode, except in cruise phase where these clearances are accurately regulated. However, during this cruise phase, a request to change the altitude of the aircraft (step-climb), which can be due either to the need to optimize the trip (therefore a planned need) or to a need of avoidance in the vicinity of an airport requested by the control tower (it is in this case sporadic and corresponds to a much less likely situation on a long-haul type trip passing off the major airports in cruise mode), may occur and force the pilot to push the throttle (action that can also be made automatically) and therefore to cause by this action an overconsumption of abradable materials reducing the performance that can be expected from the engine.

DISCLOSURE OF THE INVENTION

The present invention therefore proposes to solve this problem of wear at the tips of the blades, during a step-climb in cruise phase.

To do this, there is disclosed a method for controlling a clearance control valve of a turbomachine wherein, during a maneuver to increase the engine speed in cruise phase, a command to reduce the opening of the clearance control valve is actuated by a Full Authority Digital Engine Control (FADEC) on the basis of a change in the state of a step-climb signal provided by a flight management system (FMS) in order to increase the clearances at the tips of the turbomachine blades, the method being characterized in that an increase in the opening of the clearance control valve follows its reduction, at the expiry of either of the following two time limits: a first time limit TBD1 starting at the change in the state of the step-climb signal (SCs) and determined not to penalize the performance of the engine for too long and a second time limit TBD2 starting at the end of said maneuver and determined as a function of a thermal time constant of the casing.

Thus, when the request comes from the FMS, the anticipation of the step-climb allows preventively increasing the clearances and thus avoiding any contact with the abradable material when the pilot makes a go-around during the cruise phase. This action also allows regaining turbine performance with a high level of confidence.

Preferably, the clearance increase is obtained by a clearance management system comprising the clearance control valve and a device for projecting fresh air onto a casing of the turbomachine surrounding the blade tips.

Advantageously, the clearance management system comprises a fresh air bleed from a compressor or from a secondary flowpath of the turbomachine or from an air mixture derived from both.

Preferably, the Full Authority Digital Engine Control (FADEC) also receives from the flight management system (FMS) information relating to the altitude and position of the throttle.

Advantageously, the first time limit TBD1 is much greater than the second time limit TBD2 for example, the first time limit TBD1 is on the order of 15 minutes and the second time limit TBD2 on the order of 30 seconds.

The invention also relates to a system for controlling a clearance control valve of a turbomachine, comprising a flight management system (FMS) and a Full Authority Digital Engine Control (FADEC), characterized in that, during a maneuver to increase the engine speed in cruise phase, the Full Authority Digital Engine Control (FADEC) is able to command a reduction in the opening of the clearance control valve on the basis of a change in the state of a step-climb signal provided by the flight management system (FMS) in order to increase the clearances at the tips of the turbomachine blades, the system being characterized in that the Full Authority Digital Engine Control is configured to increase the opening of the clearance control valve following its reduction, at the expiry of either of the following two time limits: a first time limit TBD1 starting at the change in the state of the step-climb signal (SCs) and determined not to penalize the performance of the engine for too long and a second time limit TBD2 starting at the end of said maneuver and determined as a function of a thermal time constant of the casing.

Preferably, the system for controlling a clearance control valve further includes a distributed digital communication channel connecting the flight management system (FMS) to the Full Authority Digital Engine Control (FADEC).

The invention also relates to a turbomachine including a clearance control valve and such a system for controlling the clearance control valve, and to an aircraft including this turbomachine.

BRIEF DESCRIPTION OF THE DRAWINGS

Other characteristics and advantages of the present invention will emerge from the detailed description given below, with reference to the following figures without any limiting limitation and wherein.

DESCRIPTION OF THE EMBODIMENTS

Figure 1:
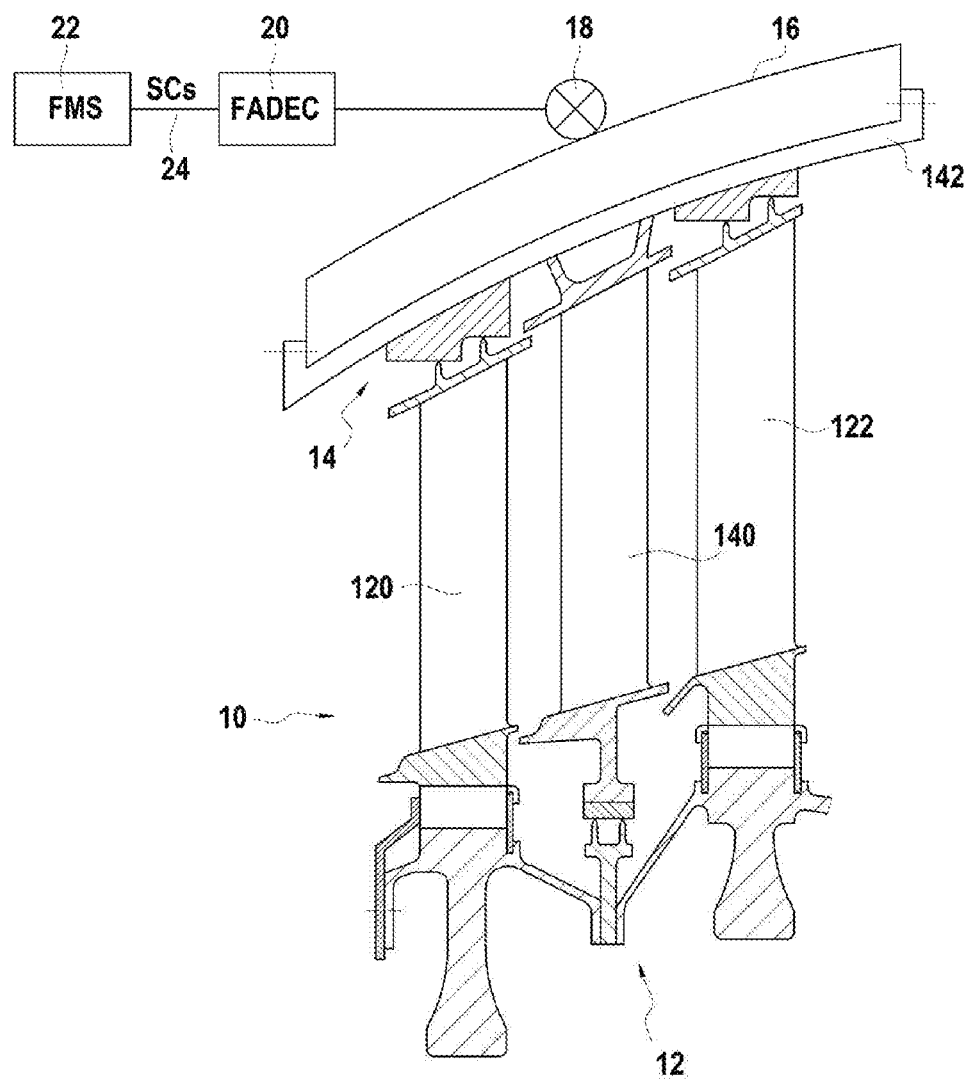
FIG. 1 partially illustrates several stages of an aircraft turbine at which the method for controlling the clearances according to the invention is applied.

FIG. 1 schematically illustrates a partial view of a turbine 10 of an aircraft turbomachine comprising, as illustrated, a rotor 12 provided with rotor blades 120, 122 and a stator 14 comprising a rectifier 140 and a casing 142. Seals are provided between the rotor and the stator whose clearances, as known, are determined by a clearance management system 16 (LPTACC for Low Pressure Turbine Active Clearance Control or HPTACC for High Pressure Turbine Active Clearance Control) positioned around the turbine and comprising a clearance control valve 18 (valve ACC) and which regulates by distribution (or projection) of fresh air the temperature of the turbine casing, thereby affecting the clearances of the seals between rotors and stators of the turbine. It is meant by "fresh air" air taken from a flowpath of the turbomachine, which is at a temperature below the temperature of the casing and which depends on the air bleed location, for example between −60 and +60 degrees for the secondary flowpath and 200 to 500 degrees for the compressor. It is therefore a relative concept, in comparison the temperature of a turbine casing is typically regulated between 600 and 900 degrees. Thus, the fresh air can be taken from the compressor or from the secondary flowpath of the aircraft turbomachine or be constituted by an air mixture derived from these two origins.

The opening of the clearance control valve is regulated by a Full Authority Digital Engine Control (FADEC) 20 which receives from a flight management system (FMS) 22 the information relating to the altitude and position of the throttle (thrust lever) actuated by the pilot as well as possibly other engine parameters such as the engine speed or the Mach number for example.

The exchanges between the FADEC ensuring the regulation of the engine and the FMS are preferably ensured by a distributed digital communication channel 24 compliant for example with the ARINC (Aeronautical Radio INCorporated) standard.

Given the densification of air traffic, flying in cruise phase is today possible only in autopilot mode (also known as auto-throttle). The pilot must therefore program the FMS 22 at the start of the mission, so as to plan, in an optimal manner, when his flight plan has altitude changes, the step-climb point(s) with respect to the desirable fuel consumption. Thus, during the flight, the FMS 22 can indicate to the pilot the moment(s) of altitude change that then starts with a change in position of the throttle made by the auto-throttle after authorization of the pilot (or possibly by the pilot himself if he has regained control for whatever reason). It is also possible that this request for altitude change comes from the FMS from a ground station for example.

According to the invention, during a step-climb in cruise phase which will be engaged by the maneuver to increase the engine speed required by this altitude change, the clearances at the tips of the turbomachine blades are increased upon receipt of a change in the state of a step-climb signal (SCs) provided by the flight management system (FMS) 22, in anticipation of the reduction of the clearances which will result from the action of the auto-throttle or, exceptionally, of the pilot on the throttle. This increase is made by reducing the opening of the clearance control valve 18 from the Full Authority Digital Engine Control (FADEC) 20, so as to cause a reduction in the projection of fresh air on the casing surrounding the blades and therefore its heating. This heating of the casing will cause its expansion and therefore increased clearance at the blade tips as desired.

However, it may turn out that the pilot is slow to authorize the action of the auto-throttle or refuses to give his authorization to operate it, deeming this maneuver inappropriate. This is why an increase in the opening of the clearance control valve follows the previous opening reduction at the expiry of either of the following two time limits: a first time limit TBD1, preferably on the order of 15 minutes, starting at the change in the state of the step-climb signal and which is a compromise chosen in an optimal manner to take into consideration, on the one hand, the situation in which the pilot would refuse the maneuver (it is then not necessary to penalize the performance of the engine for too long) and, on the other hand, the average reaction time of the pilot to accept this altitude change request; a second time limit TBD2, preferably on the order of 30 seconds, starting at the end of the maneuver and determined as a function of the thermal time constant of the casing. It will be noted that the first time limit TBD1 is much greater than the second time limit TBD2.

Figure 2:
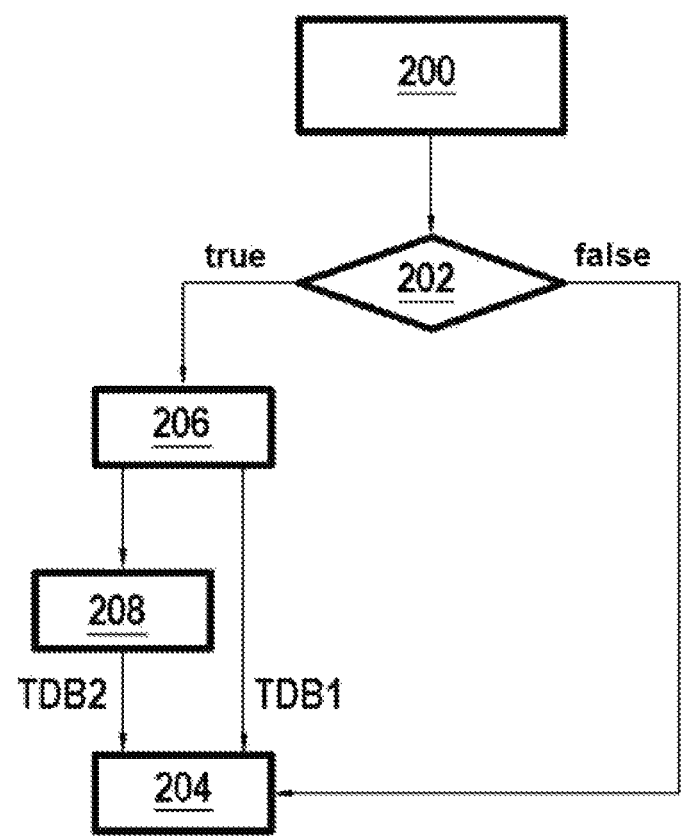
FIG. 2 is a flowchart illustrating different steps of the method of the invention.

FIG. 2 is a flowchart illustrating the consideration of these two time limits in the method for controlling the turbine clearances executed in the FADEC.

In a first step 200, the FADEC periodically recovers from the FMS Boolean information relating to the step-climb signal (True or False state of the step-climb signal). In a next step 202, the FADEC tests the state of this Boolean information and does not modify its normal instruction if this state is False, that is to say continues its current regulation of the clearances while ensuring the monitoring of the opening of the clearance control valve in a step 204. On the other hand, if this state is True, therefore showing a change in the state of this signal, it is then carried out in a new step 206 at the opening of the clearances. This state changing step executes the start of the time limit TBD1 during which the pilot is informed of the altitude change and is asked to authorize performing this maneuver automatically. As long as the long time limit TBD1 has not elapsed, the clearances remain open while waiting for the maneuver of the pilot to increase the engine speed. When the maneuver is finally engaged and then completed, this final step 208 in turn executes the start of the short second time limit TBD2 at the end of which there will be return to the step 204 of currently regulating the clearances. On the other hand, if, at the end of the time limit TBD1, the pilot has not engaged any maneuver, there is automatic return to step 204 and the current regulation of the clearances is resumed by ensuring again the control of the opening of the clearance control valve.

With this method, some gains are obtained from an average fleet of aircrafts of the long-haul type, although they may not be necessarily guaranteed for a specific pilot.

The invention claimed is:

1. A method for controlling a clearance control valve of a turbomachine comprising:
    during a maneuver to increase an engine speed in cruise phase, actuating a command to reduce an opening of the clearance control valve by a Full Authority Digital Engine Control based on a change in a state of a step-climb signal provided by a flight management system in order to increase clearances at tips of the turbomachine blades, wherein when the maneuver to increase the engine speed is followed by a slow action or no action at all of a pilot, an increase in the opening of the clearance control valve follows its reduction, at an expiry of either of the following two time limits: a first time limit starting at the change in the state of the step-climb signal and determined not to penalize performance of the engine for too long and a second time limit starting at an end of said maneuver and determined as a function of a thermal time constant of a casing.

2. The method according to claim 1, wherein the first time limit is greater than the second time limit.

3. The method according to claim 1, wherein the clearance increase is obtained by a clearance management system comprising the clearance control valve and a device for projecting fresh air onto the casing of the turbomachine surrounding the blade tips.

4. The method according to claim 3, wherein the clearance management system comprises a fresh air bleed from a compressor or from a secondary flowpath of the turbomachine or from an air mixture derived from both.

5. The method according to claim 1, wherein the Full Authority Digital Engine Control receives from the flight management system information relating to altitude and a position of the throttle.

6. A system for controlling a clearance control valve of a turbomachine, comprising:
   a flight management system; and
   a Full Authority Digital Engine Control,
   wherein, during a maneuver to increase an engine speed in cruise phase, the Full Authority Digital Engine Control is able to command a reduction in an opening of the clearance control valve based on a change in a state of a step-climb signal provided by the flight management system in order to increase clearances at tips of turbomachine blades, and wherein when the maneuver to increase the engine speed is followed by a slow action or no action at all by a pilot, the Full Authority Digital Engine Control is configured to increase the opening of the clearance control valve following its reduction, at an expiry of either of the following two time limits: a first time limit starting at the change in the state of the step-climb signal and determined not to penalize performance of the engine for too long and a second time limit starting at an end of said maneuver and determined as a function of a thermal time constant of a casing.

7. The system according to claim 6, wherein the first time limit is greater than the second time limit.

8. The system according to claim 6, further comprising a distributed digital communication channel connecting the flight management system to the Full Authority Digital Engine Control.

9. A turbomachine including a clearance control valve and a system for controlling the clearance control valve according to claim 6.

10. An aircraft including a turbomachine according to claim 9.

11. The method according to claim 2, wherein the first time limit is on an order of 15 minutes and the second time limit on an order of 30 seconds.

12. The system according to claim 7, wherein the first time limit is on an order of 15 minutes and the second time limit on an order of 30 seconds.

\* \* \* \* \*